United States Patent
Hasegawa et al.

(10) Patent No.: US 12,305,107 B2
(45) Date of Patent: May 20, 2025

(54) PERFLUOROELASTOMER COMPOSITION, CROSS-LINKED PERFLUOROELASTOMER AND MOLDED ARTICLE

(71) Applicant: NICHIAS CORPORATION, Tokyo (JP)

(72) Inventors: Chisato Hasegawa, Tokyo (JP); Kojiro Otani, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 699 days.

(21) Appl. No.: 17/415,579

(22) PCT Filed: Dec. 12, 2019

(86) PCT No.: PCT/JP2019/048684
§ 371 (c)(1),
(2) Date: Jun. 17, 2021

(87) PCT Pub. No.: WO2020/129804
PCT Pub. Date: Jun. 25, 2020

(65) Prior Publication Data
US 2022/0064507 A1    Mar. 3, 2022

(30) Foreign Application Priority Data

Dec. 17, 2018  (JP) .................... 2018-235356

(51) Int. Cl.
| | |
|---|---|
| *C09K 3/10* | (2006.01) |
| *C08J 3/24* | (2006.01) |
| *C08K 3/04* | (2006.01) |
| *C08K 5/03* | (2006.01) |
| *F16J 15/3284* | (2016.01) |

(52) U.S. Cl.
CPC .............. *C09K 3/1009* (2013.01); *C08J 3/24* (2013.01); *C08K 3/04* (2013.01); *C08K 5/03* (2013.01); *F16J 15/3284* (2013.01); *C08J 2327/18* (2013.01); *C09K 2003/1078* (2013.01); *C09K 2200/0208* (2013.01); *C09K 2200/0637* (2013.01)

(58) Field of Classification Search
CPC .......... C09K 3/1009; C09K 2003/1078; C09K 2200/0208; C08J 3/24; C08J 2327/18; C08K 3/04; C08K 5/03; F16J 15/3284
See application file for complete search history.

(56) References Cited

U.S. PATENT DOCUMENTS

| | | |
|---|---|---|
| 2005/0282969 A1 | 12/2005 | Comino et al. |
| 2010/0069558 A1 | 3/2010 | Stanga et al. |
| 2010/0216933 A1 | 8/2010 | Wang |
| 2016/0185892 A1 | 6/2016 | Shimizu et al. |
| 2017/0226255 A1 | 8/2017 | Shimizu et al. |

FOREIGN PATENT DOCUMENTS

| | | |
|---|---|---|
| CN | 101511911 A | 8/2009 |
| CN | 105452361 A | 3/2016 |
| JP | 2006-009010 A | 1/2006 |
| JP | 2012-519221 A | 8/2012 |
| JP | 2012-236969 A | 12/2012 |
| JP | 2015-512963 A | 4/2015 |
| JP | 2016-145166 A | 8/2016 |
| JP | 2016145167 A | 8/2016 |
| WO | 2010/099057 A2 | 9/2010 |
| WO | 2013/116868 A1 | 8/2013 |
| WO | 2016/017187 A1 | 2/2016 |

OTHER PUBLICATIONS

Aug. 19, 2022 Office Action issued in Chinese Patent Application No. 201980081316.9.
Mar. 17, 2020 Search Report issued in International Patent Application No. PCT/JP2019/048684.
Jun. 16, 2020 International Preliminary Report on Patentability issued in International Patent Application No. PCT/JP2019/048684.
Sep. 16, 2020 Office Action issued in Taiwanese Patent Application No. 108145989.
Aug. 1, 2022 Search Report issued in European Patent Application No. 19897856.1.

*Primary Examiner* — Ling Siu Choi
*Assistant Examiner* — Olga Lucia Donahue
(74) *Attorney, Agent, or Firm* — Oliff PLC

(57) ABSTRACT

A composition comprising a perfluoroelastomer, carbon black in an amount of 55 to 75 parts by weight per 100 parts by weight of the perfluoroelastomer, and a crosslinking agent represented by the following formula (1): wherein in the formula (1), A is a single bond, —O—, an alkylene group, or a fluoroalkylene group; $R^1$, $R^2$, and $R^3$ are independently a hydrogen atom, a fluorine atom, an alkyl group, or a fluoroalkyl group; and provided that at least one of $R^1$, $R^2$, and $R^3$ is a fluorine atom or a fluoroalkyl group.

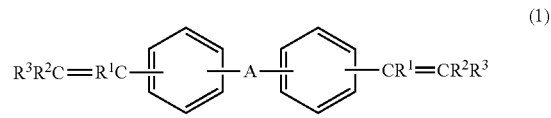

(1)

14 Claims, No Drawings

PERFLUOROELASTOMER COMPOSITION, CROSS-LINKED PERFLUOROELASTOMER AND MOLDED ARTICLE

TECHNICAL FIELD

The invention relates to a composition containing a perfluoroelastomer, a cross-linked perfluoroelastomer, and a molded article obtained from the cross-linked perfluoroelastomer.

BACKGROUND ART

Water vapor is used in various industries in various applications such as power generation. A sealing material (e.g., rubber O-ring) is used fora pipe and a device in which water vapor flows, and prevents water vapor from flowing to the outside.

In recent years, there has been a tendency that the temperature of water vapor used in power plants is elevated in order to increase the power generation efficiency. Therefore, high-temperature water vapor resistance has been required for such a sealing material.

In particular, the sealing material used in deep underground sites, such as power generation plants such as geothermal power and hot dry rock geothermal power, and an oil field is exposed to a rapid decompression environment when the pressure of the sealing target gas is suddenly released. In this case, the gas dissolved in the sealing material in the high-pressure gas environment expands at once at the time of decompression, and the sealing material cracks.

A sealing material formed of a cross-linked perfluoroelastomer is used as a sealing material having heat resistance, vapor resistance and rapid decompression resistance. Various crosslinking agents are known as crosslinking agents for cross-linked perfluoroelastomers, for example, triallyl isocyanurate (TAIC) which is generally well known as a crosslinking agent (see Patent Document 1, and the like).

RELATED ART DOCUMENT

Patent Document

[Patent Document 1] WO 2010/099057 A1

SUMMARY OF THE INVENTION

However, the general cross-linked structure represented by TAIC has a usable limit of just over 200° C., and cannot withstand use in a steam atmospheres in a temperature range over 200° C., making it difficult to use in high-temperature and high-pressure steam atmospheres of 200° C. or higher in deep underground sites, such as the aforementioned power generation plants for geothermal power, hot dry rock geothermal power, etc., and oil field.

In view of the above problems, it is an object of the invention to provide a cross-linked perfluoroelastomer excellent in heat resistance, vapor resistance, and rapid decompression resistance, and a composition for obtaining the same.

According to the invention, the following composition, cross-linked perfluoroelastomer and molded article are provided.

1. A Composition Comprising a Perfluoroelastomer,
   carbon black in an amount of 55 to 75 parts by weight per 100 parts by weight of the perfluoroelastomer, and
   a crosslinking agent represented by the following formula (1):

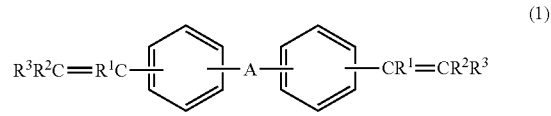

wherein in the formula (1), A is a single bond, —O—, an alkylene group, or a fluoroalkylene group; $R^1$, $R^2$ and $R^3$ are independently a hydrogen atom, a fluorine atom, an alkyl group, or a fluoroalkyl group; and provided that at least one of $R^1$, $R^2$, and $R^3$ is a fluorine atom or a fluoroalkyl group.

2. The composition according to 1, wherein A is a single bond, an alkylene group, or a fluoroalkylene group.
3. A cross-linked perfluoroelastomer obtained by crosslinking the composition according to 1 or 2.
4. A molded article made of the cross-linked perfluoroelastomer according to 3.
5. The molded article according to 4, which is an O-ring.

According to the invention, a cross-linked perfluoroelastomer excellent in heat resistance, vapor resistance, and rapid decompression resistance, and a composition for obtaining the same can be provided.

MODE FOR CARRYING OUT THE INVENTION

An embodiment of the invention is described below Note that the invention is not limited to the following embodiment.

The composition of the invention contains a perfluoroelastomer, a crosslinking agent, and carbon black.

In the invention, a compound represented by the following formula (1) is used as a crosslinking agent.

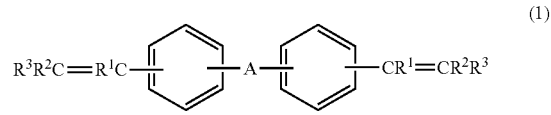

In the formula (1), A is a single bond, —O—, an alkylene group, or a fluoroalkylene group. A is preferably a single bond, an alkylene group, or a fluoroalkylene group, and is more preferably a fluoroalkylene group.

The alkylene group moiety of an alkylene group or a fluoroalkylene group may be linear or branched, and preferably includes 1 to 15 carbon atoms (more preferably 2 to 8 carbon atoms, and still more preferably 3 to 6 carbon atoms).

For the fluoroalkylene group, the alkylene group may be partially or completely fluorinated. The fluoroalkylene group is preferably a perfluoroalkylene group.

Examples of the alkylene group moiety include a methylene group, an ethylene group, a propylene group, a butylene group, a pentylene group, a hexylene group, and a heptylene group.

In the formula (1), $R^1$, $R^2$, and $R^3$ are independently a hydrogen atom, a fluorine atom, an alkyl group, or a fluoroalkyl group. Provided that at least one of $R^1$, $R^2$, and $R^3$ is a fluorine atom or a fluoroalkyl group.

The alkyl group moiety of an alkyl group or a fluoroalkyl group may be linear or branched, and preferably includes 1 to 15 carbon atoms (more preferably 1 to 6 carbon atoms, and still more preferably 1 to 4 carbon atoms).

For the fluoroalkyl group, the alkyl group may be partially or completely fluorinated. The fluoroalkyl group is preferably a perfluoroalkyl group.

Examples of the alkyl group moiety include a methyl group, an ethyl group, a propyl group, and the like.

Preferably, $R^1$, $R^2$, and $R^3$ are independently a hydrogen atom or a fluorine atom.

The following groups can be exemplified as $-CR^1=CR^2R^3$.

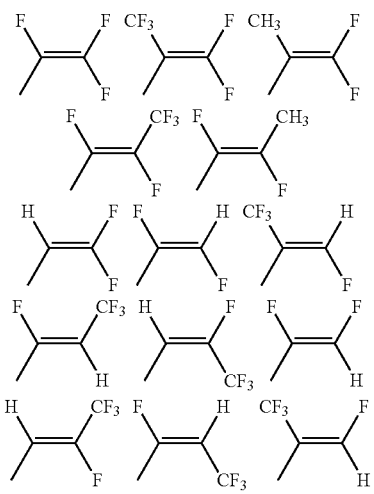

In the formula (1), A and $-CR^1=CR^2R^3$ may be in ortho-position, meth-position, or para-position to each other, and is preferably in para-position to each other. It is more preferable that A and each of two $-CR^1=CR^2R^3$'s be both in para-position to each other.

Specific examples of the compound represented by the formula (1) include compounds represented by each of the following formulas (2) to (4).

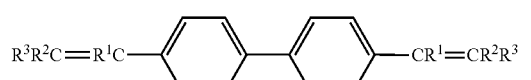
(2)

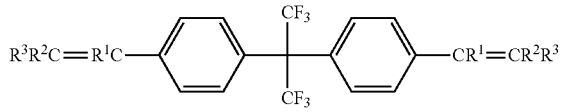
(3)

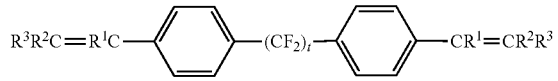
(4)

In the formulas, $R^1$, $R^2$, and $R^3$ is the same as described above. t is preferably from 1 to 15 (more preferably from 2 to 8, still more preferably from 3 to 6).

Specific examples of the compound represented by the formula (1) include the following compounds. Note that the compound can be synthesized, for example, by referring to WO2016/017187.

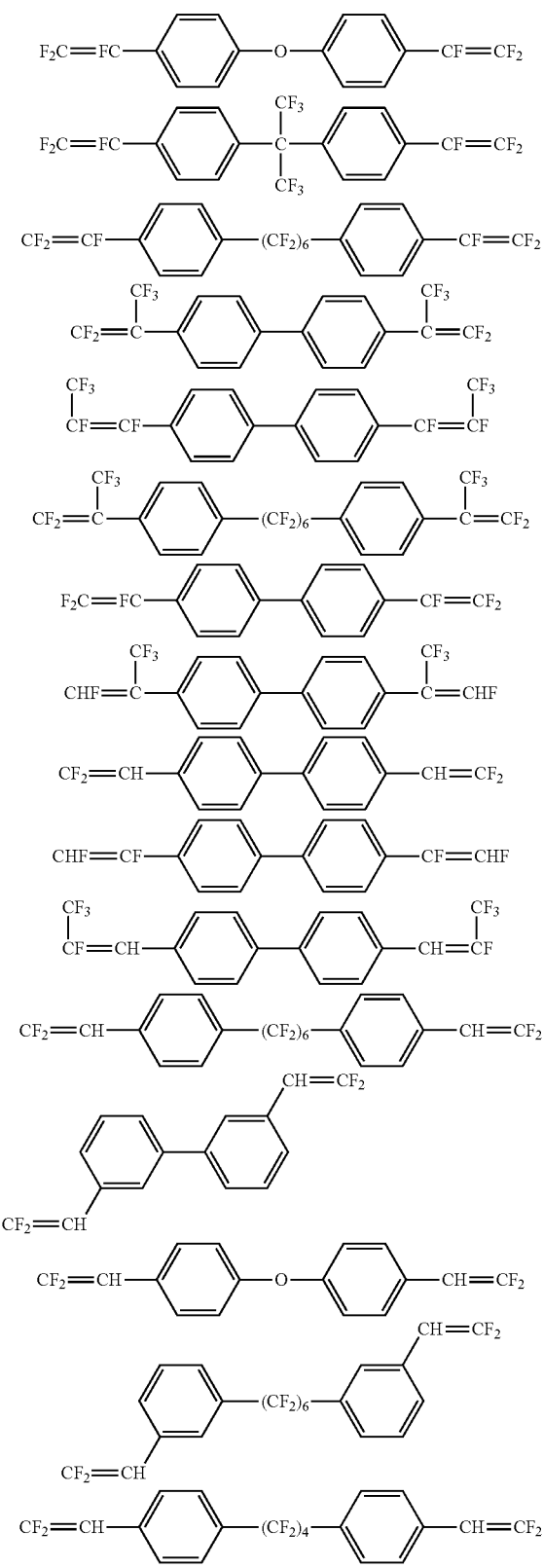

The crosslinking agent is preferably added in an amount of from 2 to 10 parts by weight, more preferably from 5 to 8 parts by weight, per 100 parts by weight of the perfluoroelastomer. The more amount of crosslinking agent is added, the more increases in vaper resistance and heat resistance tend to be obtained. However, if the crosslinking agent is excessively added, the resultant composition may become hard.

Examples of the perfluoroelastomer may include, for example, repeating units derived from the following monomers. The perfluoroelastomer may contain one or two or more repeating units derived from the monomers.

$CF_2=CF_2$ (tetrafluoroethylene)

$CF_2=CFCF_3$ (hexafluoropropylene)

The perfluoroelastomer used in the invention preferably contains iodine and/or bromine, more preferably contains iodine, as the site where radicals attack during crosslinking (curing). A perfluoroelastomer which can be cured by using a peroxide is disclosed in JP 2006-9010 A, for example.

A perfluoroelastomer generally contains iodine in an amount of from 0.001% to 5% by weight, preferably from 0.01% to 2.5% by weight, relative to the total weight of the polymer. Iodine atoms may be present along the perfluoroelastomer chain and/or at the terminal thereof.

The perfluoroelastomer is produced from a copolymer of a perfluoroolefin or the like which has one ethylenic unsaturated bond, preferably at the terminal.

Examples of the comonomer include the following compounds.

$CF_2=CFOR_{2f}$ Perfluoroalkyl vinyl ethers (PAVE)

In the formula, $R_{2f}$ is a perfluoroalkyl group including 1 to 6 carbon atoms, for example a trifluoromethyl group or a pentafluoropropyl group.

$CF_2=CFOX_o$ Perfluorooxyalkyl vinyl ethers

In the formula, $X_o$ is a perfluorooxyalkyl group including 1 to 12 carbon atoms containing one or more ether groups, for example, a perfluoro-2-propoxypropyl group.

$CFX_2=CX_2OCF_2OR''_f$ (I-B)

In the formula, $R''_f$ is a linear or branched perfluoroalkyl group including 2 to 6 carbon atoms, a cyclic perfluoroalkyl group including 5 or 6 carbon atoms, or a linear or branched perfluorooxyalkyl group including 2 to 6 carbon atoms which contains 1 to 3 oxygen atoms; and $X_2$ is F.

The perfluorovinyl ethers of the formula (I-B) is preferably represented by the following formula:

$CFX_2=CX_2OCF_2OCF_2CF_2Y$ (II-B)

In the formula, Y is F or $OCF_3$; and $X_2$ is as defined above.

The following perfluorovinyl ethers represented by each of the following formulas are preferable.

$CF_2=CFOCF_2OCF_2CF_3$ (MOVE1)

$CF_2=CFOCF_2OCF_2CF_2OCF_3$ (MOVE2)

Examples of a preferable monomer composition include the following compositions.

Tetrafluoroethylene (TFE): 50 to 85 mol %, PAVE: 15 to 50 mol %

TFE: 50 to 85 mol %, MOVE: 15 to 50 mol %

The perfluoroelastomer may also contain fluoroolefins including 3 to 8 carbon atoms which may contain a vinylidene fluoride-derived unit, iodine, and/or bromine.

The composition of the invention contains carbon black as a filler. Preferably, the mean particle diameter of carbon black is 100 nm or more, more preferably 250 nm or more. The composition contains carbon black in an amount of from 55 to 75 parts by weight, preferably from 58 to 72 parts by weight, more preferably from 60 to 70 parts by weight per 100 parts by weight of the perfluoroelastomer. By using the crosslinking agent represented by the formula (1) and containing carbon black in a predetermined amount, rapid decompression resistance increases.

The compositions of the invention may contain a crosslinking initiator As the crosslinking initiator, commonly used crosslinking initiators may be employed. Examples of the crosslinking initiator include a peroxide, an azo compound, and the like.

The crosslinking initiator is preferably added in an amount of from 0.3 to 35 mmol, more preferably from 1 to 15 mmol, and still more preferably from 1.5 to 10 mmol per 100 g of the perfluoroelastomer. The more amount of crosslinking agent is added, the more vaper resistance and heat resistance tend to increase. However, if the crosslinking initiator is added in an excessive amount, scorching or foaming may occur.

The composition of the invention may contain a plasticizer. Examples of the plasticizer include a fluorine plasticizer such as perfluoropolyether. The plasticizer is preferably added in an amount of from 1 to 9 parts by weight, and more preferably from 1 to 5 parts by weight per 100 parts by weight of the perfluoroelastomer. Productivity is improved when a plasticizer is contained.

The composition may contain a crosslinking assistant. Examples of the crosslinking assistant include zinc oxide, activated alumina, magnesium oxide, a quatemary ammonium salt, a quatemary phosphonium salt, an amine, and the like. The crosslinking assistant can increase crosslinking efficiency and heat resistance. The crosslinking assistant is usually added in an amount of from 0.1 to 10 parts by weight per 100 parts by weight of the perfluoroelastomer.

A filler other than carbon black may be blended into the perfluoroelastomer composition. As such a filler, commonly fillers for an elastomer may be used as long as it does not impair the effects of the invention. Examples of the filler include silica, barium sulfate, titanium dioxide, a semicrystalline fluoropolymer, a perfluoropolymer, and the like.

A thickener, a pigment, a coupling agent, an antioxidant, a stabilizer, or the like may optionally be added to the composition in an appropriate amount.

The composition of the invention may consist essentially of, or may consist of, a perfluoroelastomer, a crosslinking agent, and carbon black. The term "consist essentially of" means that these components account for at least 85% by weight, at least 90% by weight, at least 95% by weight, or at least 98% by weight of the composition.

A crosslinked perfluoroelastomer can be obtained by crosslinking the composition of the invention.

In the case of one-step heating, the crosslinking condition is preferably 100 to 250° C. for 10 minutes to 5 hours.

In the case of two-step heating, the raw materials are normally put in a mold, and crosslinking with pressing is carried out as a primary crosslinking. In the primary crosslinking, heating is performed at 150 to 200° C. for 5 to 60 minutes, for example. The resulting product is removed from the mold, and subjected to a secondary crosslinking. In the secondary crosslinking, heating is performed at 150 to 350° C. for 1 to 100 hours for example. The crosslinking process may be performed using an electric furnace or the like. Deformation during use and the like can be prevented by providing a heat history through a secondary crosslinking.

The crosslinking process may be performed in an inert gas atmosphere or in air.

As the inert gas, nitrogen, helium, argon, and the like may be used, and nitrogen is preferable. The oxygen concentration in the inert gas atmosphere is preferably 10 ppm or less, and more preferably 5 ppm or less.

The crosslinked perfluoroelastomer obtained by the above production method may be used as a sealing material, and can be used as a molded product such as a gasket or a seal ring.

EXAMPLES

Example 1

A composition was prepared by mixing 100 parts by weight of perfluoroelastomer (PFE40Z, 3M Japan Limited), 7 parts by weight of a compound of the formula (1) ($R^1$, $R^2$, and $R^3$ are fluorine atoms; A is —$(CF_2)_6$—)) (crosslinking agent), 65 parts by weight of carbon black (MT) (Thermax N990, Cancarb Limited), 3 parts by weight of fluorine plasticizer (Krytox VPF16256, Chemours Kabushiki Kaisha), and 2 parts by weight of an organic peroxide (Perhexa 25B, NOF CORPORATION) as cross-linking initiator. Note that the crosslinking agent was synthesized by referring to WO2016/017187.

The above composition was crosslinked to produce two types of O-rings having different sizes which were each composed of crosslinked fluoroelastomers (outer diameter: about 25.90 mm, inner diameter about 15.24 mm, and outer diameter about 32.06 mm, inner diameter about 25.00 mm) (molded product). The crosslinking conditions were at a temperature of 170° C. for 40 minutes for the primary crosslinking, and at a temperature of 310° C. for 4 hours under a nitrogen atmosphere for the secondary crosslinking.

The obtained molded products were evaluated as described below. The results are shown in Table 1.

(1) Rapid Decompression Resistance (RGD Resistance)

The test was conducted in accordance with NORSOK standard. The O-ring was set in a jig having a groove to accommodate the O-ring inside such that the compression ratio became 15% (normal temperature) and the filling ratio of the O-ring to the groove volume became 80%, and the jig was sealed in the pressure vessel. The pressure in the pressure vessel was raised to 15 MPa at 100° C. or 300° C., held for 68 hours in the first cycle, then rapidly reduced to atmospheric pressure with a decompression rate of 2 MPa/min, and held for 1 hour. This pressure increase and pressure reduce cycle was repeatedly performed, and in the second cycle and subsequent cycles, the holding time after the pressure in the pressure vessel was raised to 15 MPa was alternately changed to 6 hours and 12 hours, and the cycle was repeated 8 times. After the test, the O-ring was cut at four points, and the cross sections were observed. Two O-rings were used for the 100° C. and 300° C. tests, respectively.

The number and length of cracks present in the cut surface were counted and measured, and the rapid decompression resistance was evaluated on the basis shown in Table 2. The "wire diameter" in Table 2 means the wire diameter of the O-ring before the test (initial wire diameter). Scores of 0 to 3 were "acceptable", and scores of 4 and 5 were "not acceptable".

(2) Heat Resistance

The obtained O-ring was fastened to two flat plates by bolts so as to compress by 25% using a spacer, and the fastened body was exposed to heat in a gear oven under predetermined conditions (200, 250, or 300° C. for 72 hours in an atmospheric environment). Thereafter, the fastened body was taken out from the gear oven, the O-ring was released while the fastening body was hot, and the O-ring was allowed to cool to room temperature, and then the wire diameter of the O-ring was measured, and the compressive set was calculated by the following expression (unit: %). This compression set was defined as a "heat-resistance".

Compression set=(initial wire diameter−wire diameter after heat exposure)/(initial wire diameter−spacer thickness)×100

(3) Vapor Resistance

By using a pressure vessel having a groove in which an O-ring was made to have a compression ratio of 25% and a space in which water was poured inside, the O-ring was put into the groove, water was put into the space, and the pressure vessel was tightened with bolts. The vessel was held in a gear oven at predetermined conditions (250° C. or 300° C. for 72 hours) and water was turned into saturated vapor. After that, the vessel was taken out from the gear oven, allowed to cool to room temperature, and then the O-ring was released.

Then, the O-ring after being subjected to the above process was compressed so as to have the same compression ratio as the groove depth by two flat plates and a spacer, tightened with bolts. The fastened body was exposed to heat at a predetermined condition (250 or 300° C. for 1 hour) and taken out from the gear oven. The O-ring was released while the fastening body was hot, and cooled to room temperature. The wire diameter of the O-ring was measured, and the compression set (unit: %) was calculated from the following expression. This test result was defined as a "vapor resistance". The smaller the compression set is, the higher the vapor resistance is.

Compression set=(initial wire diameter−wire diameter after heat exposure)/(initial wire diameter−groove depth)×100

Comparative Example 1

Two types of O-rings were produced in the same manner as in Example 1, except that the blending amount of carbon black (MT) was changed to 50 parts by weight. The results are shown in Table 1.

Comparative Example 2

Two types of O-rings were produced in the same manner as in Example 1, except that the crosslinking agent was changed to triallyl isocyanurate (TAIC). The results are shown in Table 1.

Comparative Example 3

An attempt was made to produce an O-ring in the same manner as in Example 1, except that the blending amount of carbon black (MT) was changed to 80 parts by eight, but there was a problem in moldability.

The test for rapid decompression resistance was carried out using two O-rings at temperatures of 10000 and 300° C. With respect to the rapid decompression resistance, Comparative Examples 1 and 2 were both inferior to those of Example 1. In addition, with respect to the test result of the vapor resistance at 300° C. for 72 hours, Comparative Example 2 was also inferior to that of Example 1.

TABLE 1

| Composition | | Example 1 PFE40Z | Comp. Ex. 1 PFE40Z | Comp. Ex. 2 PFE40Z |
|---|---|---|---|---|
| | Polymer | | | |
| | Crosslinking agent | Compound (1) 7 parts by weight | Compound (1) 7 parts by weight | TAIC 7 parts by weight |
| | Filler | MT 65 parts by weight | MT 50 parts by weight | MT 65 parts by weight |
| | Plasticizer | fluorine plasticizer 3 parts by weight | fluorine plasticizer 3 parts by weight | fluorine plasticizer 3 parts by weight |
| Rapid decompression resistance | NORSOK 100° C. | 0.0 | 5.2 | 3.3 |
| | NORSOK 300° C. | 0.3 | 3.3 | 5.5 |
| Heat resistance | 200° C. × 72 hr | 32 | 28 | 19 |
| | 250° C. × 72 hr | 37 | 36 | 61 |
| | 300° C. × 72 hr | 58 | 58 | 88 |
| Vapor resistance | 250° C. × 72 hr + 1 hr | 23 | 27 | 17 |
| | 300° C. × 72 hr + 1 hr | 36 | 33 | 65 |

TABLE 2

| Score | Standard (NORSOK) | | |
|---|---|---|---|
| | Number of Cracks | Length of Cracks | Total length of Cracks |
| 0 | 0 | | 0 |
| 1 | ≤4 | <wire diameter × 0.5 | ≤wire diameter × 1.0 |
| 2 | ≤6 | <wire diameter × 0.5 | ≤wire diameter × 2.5 |
| 3 | ≤9 | <wire diameter × 0.5 OR | — |
| | ≤2 | <wire diameter × 0.8 | — |
| 4 | 8≤ | <wire diameter × 0.8 OR | — |
| | 1≤ | wire diameter × 0.8≤ | — |
| 5 | | Cracks penetrated the cross-section and the O-ring was split and shattered. | |

INDUSTRIAL APPLICABILITY

The crosslinked fluoroelastomer of the invention can be used as a sealing material of power generation plants such as geothermal power and hot dry rock power, an oil field, a compressor, and an O-ring used for a high pressure valve.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A composition comprising:
   a perfluoroelastomer,
   carbon black in an amount of 55 to 75 parts by weight per 100 parts by weight of the perfluoroelastomer,
   a crosslinking agent represented by the following formula (1), and
   a fluorine plasticizer in an amount of 1 to 5 parts by weight per 100 parts by weight of the perfluoroelastomer:

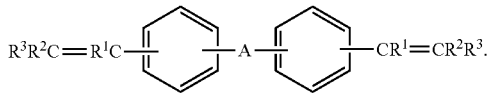

(1)

wherein in the formula (1), A is a single bond, —O—, an alkylene group, or a fluoroalkylene group; $R^1$, $R^2$, and $R^3$ are independently a hydrogen atom, a fluorine atom, an alkyl group, or a fluoroalkyl group; and provided that at least one of $R^1$, $R^2$, and $R^3$ is a fluorine atom or a fluoroalkyl group.

2. The composition according to claim 1, wherein A is a single bond, an alkylene group, or a fluoroalkylene group.

3. A cross-linked perfluoroelastomer obtained by crosslinking the composition according to claim 1.

4. A molded article made of the cross-linked perfluoroelastomer according to claim 3.

5. The molded article according to claim 4, which is an O-ring.

6. The composition according to claim 1, wherein A is a linear or branched alkylene group having 1 to 15 carbon atoms.

7. The composition according to claim 1, wherein A is a linear or branched fluoroalkylene group having 1 to 15 carbon atoms.

8. The composition according to claim 1, wherein when any of $R^1$, $R^2$, and $R^3$ are an alkyl group, the alkyl group has 1 to 15 carbon atoms.

9. The composition according to claim 1, wherein when any of $R^1$, $R^2$, and $R^3$ are a fluoroalkyl group, the fluoroalkyl group has 1 to 15 carbon atoms.

10. The composition according to claim 1, wherein the perfluoroelastomer comprises repeating units obtained from tetrafluoroethylene, hexafluoropropylene, or both tetrafluoroethylene and hexafluoropropylene.

11. The composition according to claim 1, wherein the perfluoroelastomer comprises iodine in an amount of from 0.001% to 5% by weight relative to a total weight of the perfluoroelastomer.

12. The composition according to claim 1, wherein the carbon black has a mean particle diameter of 100 nm or more.

13. The composition according to claim 1, further comprising a crosslinking initiator.

14. The composition according to claim 1, further comprising a crosslinking assistant.

* * * * *